United States Patent [19]
Green et al.

[11] 3,855,987
[45] Dec. 24, 1974

[54] ROTARY ENGINE OIL LUBRICATION SYSTEM

[75] Inventors: Raymond J. Green, Northville; Erkki A. Koivunen, Livonia, both of Mich.

[73] Assignee: General Motors Corporation, Detroit, Mich.

[22] Filed: Jan. 14, 1974

[21] Appl. No.: 432,848

[52] U.S. Cl............. 123/196 R, 123/8.01, 184/6.28, 418/87
[51] Int. Cl.......................... F01m 1/02, F01c 21/04
[58] Field of Search.............. 123/8.01, 8.25, 196 R; 418/84, 88, 87; 184/6.5, 6.4, 6.28

[56] References Cited
UNITED STATES PATENTS

| | | |
|---|---|---|
| 3,485,324 | 12/1969 | Novak............................ 123/196 R |
| 3,528,398 | 9/1970 | Weissflog et al................ 123/196 R |
| 3,788,782 | 1/1974 | Morgan............................... 418/84 |
| 3,819,304 | 6/1974 | Demers............................... 418/88 |

Primary Examiner—Manuel A. Antonakas
Attorney, Agent, or Firm—Ronald L. Phillips

[57] ABSTRACT

A rotary engine oil lubrication system having a compact arrangement of oil pump and pressure regulator valves with one regulator valve regulating oil pressure for distribution to the engine's main bearings, rotor bearings, phase gears and interior of the rotors and another regulator valve regulating the oil pressure upstream of a cooler that acts to cool the oil prior to its distribution and with all the oil overage from the regulating operations of both these valves delivered directly to the suction chamber of the pump rather than to the engine's oil tank from which the pump draws the used oil that drains from the engine.

5 Claims, 7 Drawing Figures

ROTARY ENGINE OIL LUBRICATION SYSTEM

This invention relates to a rotary engine oil lubrication system and more particularly to such a system having a distribution pressure regulator valve and a cooler pressure regulator valve that both exhaust directly to pump suction.

It is known in rotary combustion engine lubrication systems wherein oil is also circulated through the rotor and then cooled by a remote cooler to have an oil pressure regulator valve that regulates the oil distribution at a desired value and another pressure regulator or relief valve that limits the pressure at the cooler to an acceptable value. In such arrangements, both the distribution pressure regulator valve and cooler pressure regulator valve normally exhaust their overage to the oil sump from which it then must be drawn back by the pump. This places a heavy burden on the pump in satisfying the system wherein substantial excess flow is desired throughout the engine's speed range to maintain a higher circulation rate through the cooler than through the engine to meet the high heat loads of the rotor with a relatively small cooler.

An object of the present invention is to provide a new and improved rotary combustion engine oil lubrication system.

Another object is to provide in a rotary combustion engine oil lubrication system a distribution pressure regulator valve and a cooler pressure regulator valve that in their regulating operations exhaust overage directly to the suction side of the system's pump rather than to the system's oil sump to thereby increase the pump's volumetric efficiency.

Another object is to provide in a rotary combustion engine oil lubrication system a compact arrangement of distribution pressure regulator valve, cooler pressure regulator valve and engine driven pump concentric with the engine crankshaft wherein the pump normally draws from an oil tank beneath the engine to which the circulated oil normally drains and wherein both the regulator valves having exhaust ports directly open to the pump's suction chamber so that all the overage from pressure regulation is delivered directly to pump suction in bypass relation to the oil tank to increase the pump's volumetric efficiency.

These and other objects of the present invention will be more apparent from the following description and drawing in which.

Figure 1:
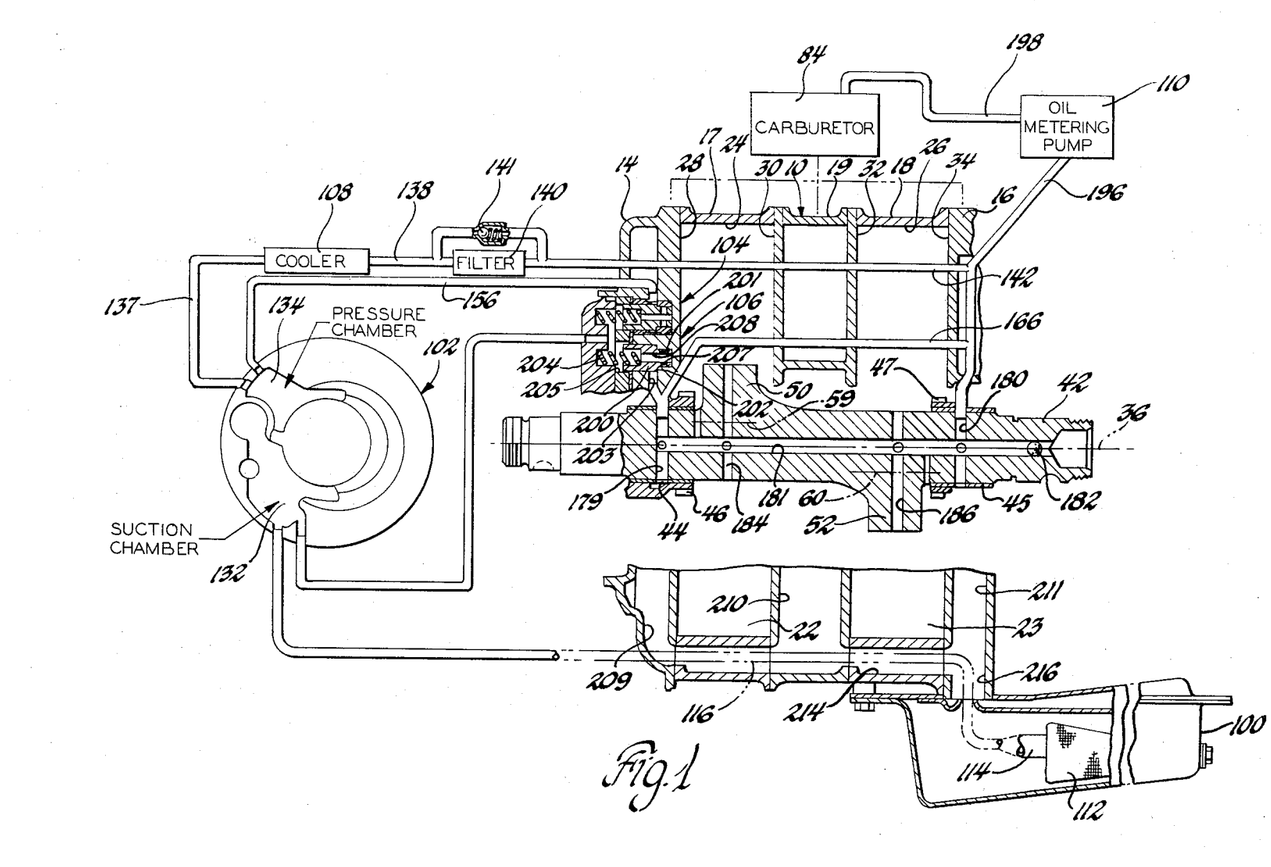
FIG. 1 is a layout with some parts shown diagrammatically and some parts shown in section of a rotary combustion engine oil lubrication system according to the present invention.
Figure 2:
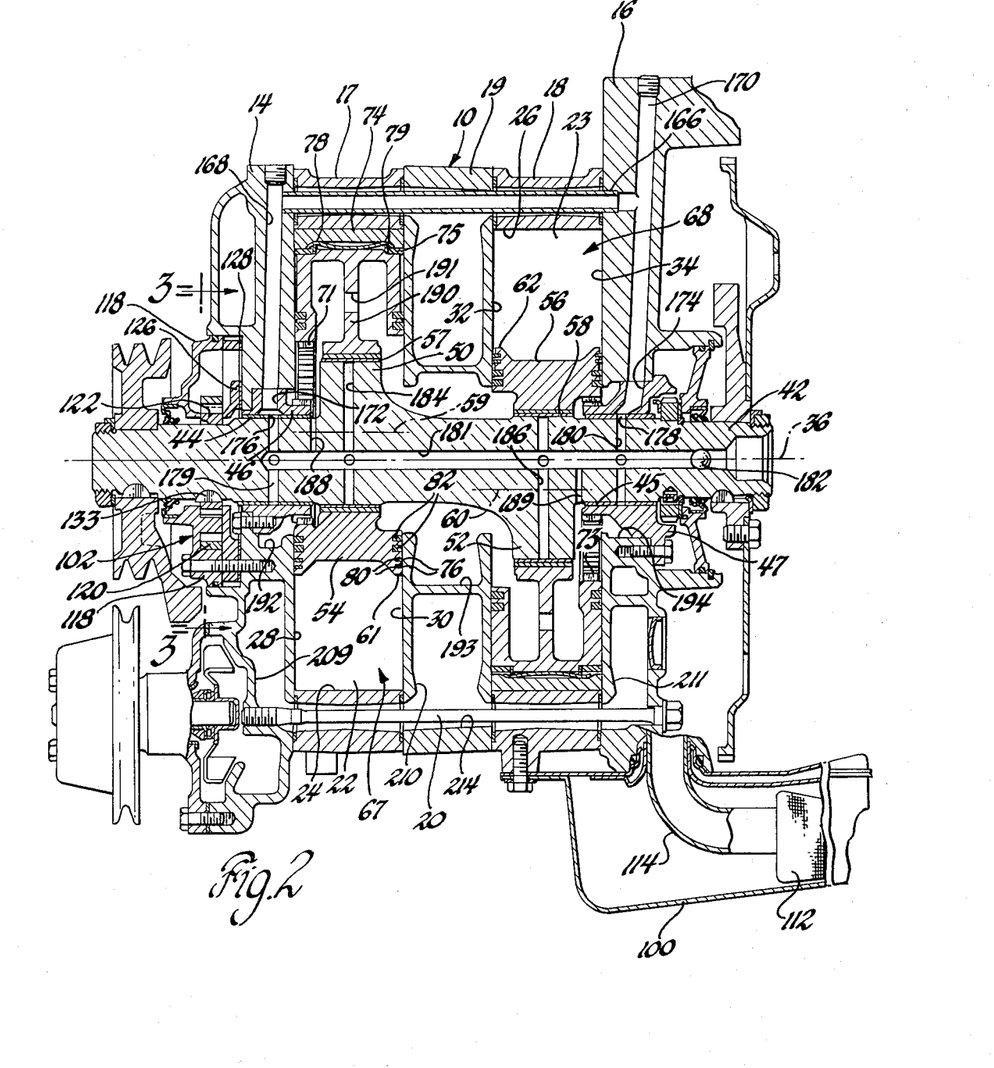
FIG. 2 is a longitudinal sectional view of the rotary combustion engine depicted in FIG. 1 showing further details of the oil lubrication system.

Referring to FIGS. 1 and 2, there is shown a two-rotor rotary engine 10 having an oil lubrication system according to the present invention that delivers oil to lubricate the engine's rubbing parts and also to cool the rotors. The engine 10 has an outer body comprising a pair of end housings 14 (front) and 16 (rear), a pair of rotor housings 17 and 18, and an intermediate housing 19 between the two rotor housings 17 and 18, all clamped together by bolts 20. The engine housing encloses a pair of chambers 22 and 23 that are defined respectively by inwardly facing peripheral walls 24 and 26 of rotor housings 17 and 18 and opposed, spaced parallel end walls 28, 30 and 32, 34 of the end housing 14 and intermediate housing 19 and the latter housing and other end housing 16. Each of the peripheral walls 24 and 26 is in the shape of a two-lobe epitrochoid or curve parallel thereto whose center line is indicated at 36. A crankshaft 42 extends through the chambers 22 and 23 and is rotatably supported in main sleeve bearings 44 and 45 which are fixed in stationary gears 46 and 47 that are bolted to the respective end housings 14 and 16 as shown in FIG. 2, the crankshaft's axis being coincident with the center line 36 which is parallel to the peripheral walls 24 and 26.

The crankshaft 42 is provided in the housing chambers 22 and 23 with eccentrics 50 and 52 on which hollow rotors 54 and 56 having sleeve bearings 57 and 58 are mounted for rotation about the eccentric centers 59 and 60, these centers being located 180° apart and spaced equal distances from the crankshaft axis 36. The rotors 54 and 56 have the same general shape of a triangle having respectively three faces 61 and 62 which are convex and face the peripheral walls 24 and 26 and cooperate therewith and with the end walls 28, 30 and 32, 34 to define three variable volume working chambers 67 and 68 that are spaced about the rotors and move with the rotors within the engine housing.

A fixed cyclic relation between each of the rotors and the crankshaft is obtained by gearing between each of the rotors and the housing. Referring to rotor 54, there is the stationary gear 46 which is fixed to the housing and is received about and is concentric with the crankshaft 42. The gear 46 meshes with an internal tooth gear 71 that is concentric with and formed on the outboard side of rotor 54. The gear 71 has one and one-half times the number of teeth as the gear 70 with result that this gearing enforces a fixed cyclic relation such that the crankshaft makes three complete revolutions for every one complete revolution of the rotor. Similarly, the other stationary gear 47 meshes with an internal tooth gear 73 on the other rotor 56 with their mesh at a location diametrically opposite that of gears 46 and 71. Thus, the chambers 67 and 68 move with the respective rotors 54 and 56 as they revolve about their axes while also revolving about the crankshaft axis with each chamber twice undergoing expansion and contraction during each rotor revolution.

Sealing of the working chambers such as the working chambers 67 is effected by three apex seals 74 each of which extends the width of the rotor and is mounted in an axially extending slot at one of the rotor apexes, six corner seals 75 each of which is mounted in a hole in one of the rotor sides near one of the rotor apexes, and twelve side seals 76 each of which is mounted in arcuate grooves in one of the rotor sides with these seals arranged in pairs and extending adjacent one of the rotor faces between two of the corner seals with the corner seals each providing a sealing link between one apex seal and the adjacent ends of two pairs of side seals. The apex seals 74 are each urged radially outward by a leaf spring 78 to continuously engage the peripheral wall 24 and both the corner seals 75 and the side seals 76 in both rotor sides are urged axially outward by suitably shaped springs 79 and 80 to continously engage the respective end walls 28 and 30. In addition, there is mounted in grooves in each rotor side inward of the side seals 76 a pair of wave spring biased circular oil seals 82 which are concentric with the rotor and sealingly engage the opposite end wall to prevent oil from reaching further outward. The rotor 56 carries a similar gas and oil sealing arrangement.

A carburetor 84 shown in FIG. 1 delivers a combustible air-fuel mixture to an induction passage arrangement, not shown, that includes an intake manifold which is connected to the engine housing and has branches which communicate in the engine housing with intake ports in the respective end walls 28, 30 and 32, 34. Upon rotor rotation the combustible air-fuel mixture is sequentially, periodically admitted to the chambers 67 and 68 as they are expanding by the traversing motion of the rotor sides relative to the respective intake ports whereafter the chambers then close to their intake ports and contract to compress the thus trapped air-fuel mixture in readiness for ignition. Combustion by spark ignition is provided by a suitable ignition system, now shown, which applies voltage at the proper time to pairs of spark plugs which are mounted on the rotor housings with their electrodes open to the chambers through the respective peripheral walls. For example, the electrodes of the two spark plugs mounted on rotor housing 17 are open to the chambers 67 through the interior peripheral wall 24 and are peripherally spaced thereabout so that one plug leads the other plug relative to rotor rotation. In such an arrangement both plugs are fired at the same or different times or only one plug is fired according to certain engine operating conditions as is well known. With combustion the peripheral wall takes the reaction to force the rotor to continue rotating and eventually each working chamber following the power phase is exhausted during the exhaust phase by exhaust passage means, not shown, that includes an exhaust port in the peripheral wall 24 that is periodically traversed by the rotor apexes and is open to an exhaust manifold secured to the exterior of the engine housing. The engine structure thus far described is of conventional type and for a more detailed understanding thereof reference may be made to U.S. Pat. Nos. 2,988,065 and 3,077,867.

The oil lubrication system according to the present invention generally comprises an oil tank 100 which acts as the system's sump or reservoir, an oil pump 102, a cooler pressure regulator valve assembly 104, a distribution pressure regulator valve assembly 106, a cooler 108 and an oil metering pump 110, all of which is shown diagrammatically in FIG. 1.

The oil tank 100 which is of sheet metal construction is bolted to the underside of the engine and extends rearwardly of the rear end housing 16 as shown in FIG. 2. Oil is drawn from the oil tank through a screen assembly 112 in the tank and then a pipe 114 that extends through a sealed aperture in the roof of the tank into the engine's rear housing 16. The oil thereafter passes through a horizontal passage 116 in the two rotor housings 17 and 18 and the intermediate housing 19 and into the front housing 14 where the oil pump 102 is mounted.

Figure 3:
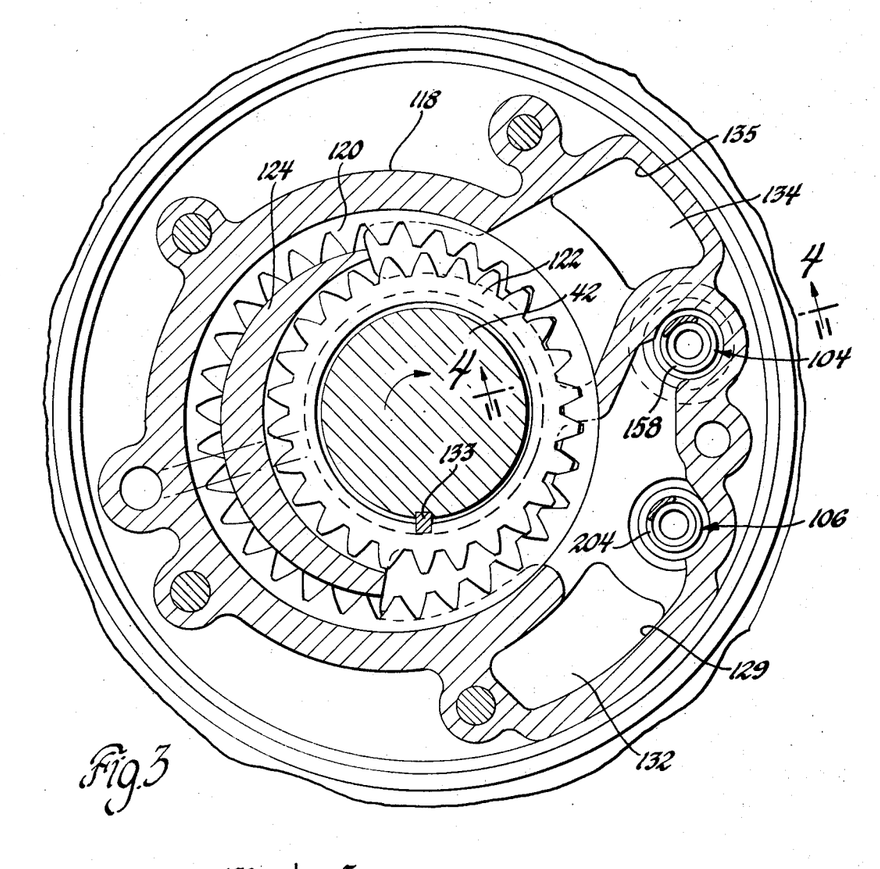
FIG. 3 is an enlarged view of the oil pump, cooler pressure regulator valve assembly and distribution pressure regulator valve assembly taken along the line 3—3 in FIG. 2.
Figure 6:
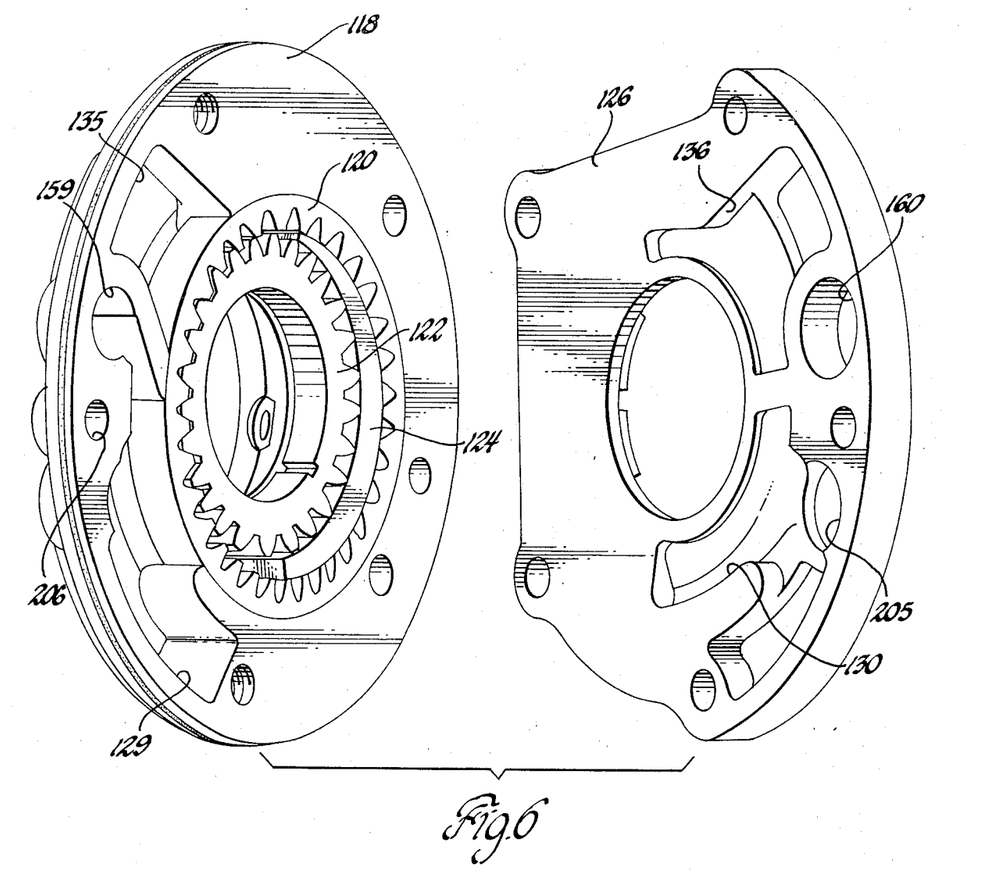
FIG. 6 is an exploded view of the oil pump body and cover.
Figure 7:
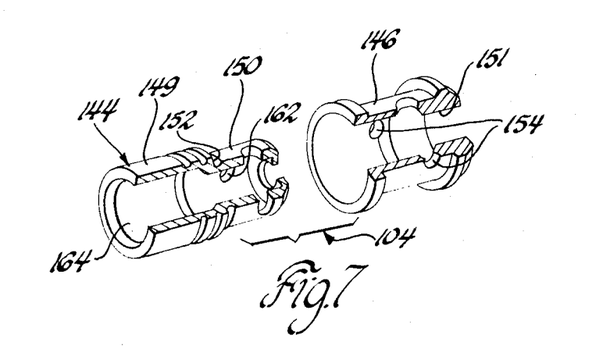
FIG. 7 is an exploded view of the cooler pressure regulator valve and sleeve.

The oil pump 102 is of the internal-external gear type and as shown in FIGS. 2, 3 and 6 comprises an annular pump body 118 in which both an annular internal tooth gear 120 and an annular external tooth gear 122 are flush mounted with a crescent 124 formed in the pump body interposed between these gears opposite where they mesh. A cover plate 126 closes the open side of the pump body 118 and both the pump body and cover are received about the front end of the crankshaft and are bolted to the front face of the front end housing 14 with a gasket 128 between the pump body and front end housing as shown in FIG. 2. The pump body 118 and cover 126 have cavities 129 and 130 in their interfaces as best shown in FIG. 6 which cooperate to provide a suction chamber 132 into which oil is drawn from the suction passage 116. The external tooth gear 122 is secured to the crankshaft 42 by a key 133 and the internal tooth gear 120 which is driven thereby is rotatable in the pump body so that on crankshaft rotation in the direction indicated by the arrow in FIG. 3, the meshing gears draw oil from the suction chamber 132 and then deliver it around the crescent to a pressure chamber 134 which is provided by cooperating cavities 135 and 136 in the interfaces of the pump body and cover as best shown in FIG. 6. As shown in FIG. 1, oil under pressure in the pressure chamber 134 exits to an external pressure line in the form of a hose 137 which directs the oil out to the cooler 108 which is located in the vehicle's radiator. Oil passes through the cooler 108 and then via a hose 138 back to a passage in the rear end housing 16 which directs it to a filter 140 that is mounted on this housing. A spring biased ball type bypass valve 141 is connected in parallel with the filter 140 to bypass oil past the filter when the build-up of collected foreign matter in the latter reaches a certain flow resistance level. From the filter, oil is distributed by a distribution passage 142 within the engine.

Figure 4:
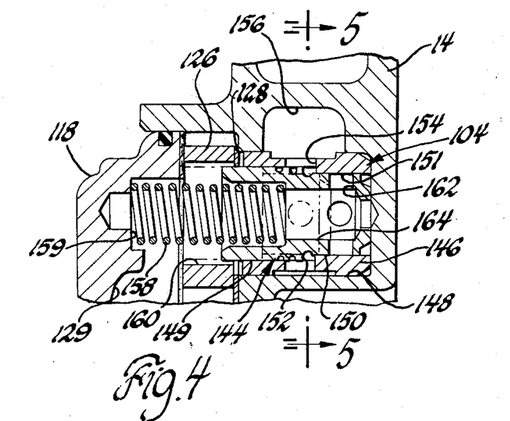
FIG. 4 is a view of the cooler pressure regulator valve assembly taken along the line 4—4 in FIG. 3.
Figure 5:
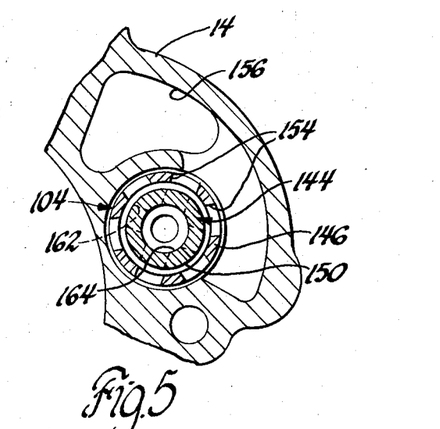
FIG. 5 is a view of the cooler pressure regulator valve taken along the line 5—5 in FIG. 4.

The pressure feed to the cooler 108 is controlled by the cooler pressure regulator valve assembly 104 which is connected in parallel with the cooler to limit the pressure it experiences to an acceptable value from a cooler strength standpoint which may, for example, be about 80 psi. The cooler pressure regulator valve assembly 104 comprises a hollow cylindrical valve 144 which is mounted for reciprocal movement in a sleeve 146 that is fitted in a closed-end bore 148 in the interface of the front end housing 14 as best shown in FIG. 4. The purpose of sleeve 146 is to provide complete cylindrical wall support for valve 144 which was not obtainable in the particular front end housing structure. The valve 144 has two different external diameters 149 and 150 with the bore 151 of the sleeve stepped accordingly. This provides the valve with an unbalanced area 152 which is open through several of a plurality of radial ports 154 in the sleeve 146 to a passage 156 in the front end housing 14 that is open to the cavity 136 in the pump cover 126 and thus to the pump's pressure chamber 134. The oil pressure upstream of the cooler acts on the unbalanced area 152 in opposition to the bias provided by a coil spring 158 which as best shown in FIG. 4 is seated at its left end in a recess 159 in the pump body and at its right end on an internal shoulder in the valve, the spring being freely received by an aperture 160 through the cover with this aperture also freely receiving the left end of the valve element 144 where it extends outward of the sleeve 146. As the oil pressure on the unbalanced area 152 increases, the valve retreats moving against the spring 158 to open radial ports 162 in the valve to the sleeve ports 154 as shown in the dash-line position in FIG. 4. The excess oil received in the ports 162 passes into an axial hole 164 in the center of the valve and then out the left end thereof through the cover plate aperture 160 and then into the sump suction chamber 132 via the suction chamber cavity 129 in the pump body 118 which is open to the spring seat recess 159 as best shown in FIGS. 3, 4 and 6. Thus, as the oil pressure increases and the valve opens against the spring bias to establish the desired cooler pressure, all the excess oil is shunted directly into the suction chamber 132 of the pump rather than back to the oil tank 100 from which it would then have to be drawn through a very long passage back to the suction chamber.

As shown in FIG. 2, the pressure distribution passage 142 runs into an oil gallery tube 166 that passes through passages in the rotor housings 17 and 18 and intermediate housing 19 and joins at opposite ends in the end housings 14 and 16 with long drilled holes 158 and 170, respectively, that run from the gallery toward the center of the housings and stationary gears 46 and 47. The oil gallery tube 166 is a push or press fit in the front and rear end housings 14 and 16 so that oil pressure passes through the tube and does not have to cross the several gasketed joints of the engine. Oil is forced into the crankshaft 12 near each end through respective holes 172 and 174 in the front and rear stationary gears 46 and 47, radial holes 176 and 178 in the front and rear main bearings 44 and 45 and then radial holes 179 and 180 in the crankshaft 42 to a long axial feed hole 181 in the crankshaft that is bored from the rear end thereof and is plugged by a press-fitted ball 182. Thus, the main bearings 44 and 45 are fed with oil for lubrication and, in addition, radial holes 184 and 186 connect the axial feed passage 181 to feed oil to the rotor bearings 57 and 58 for their lubrication. In addition, radial orifices 188 and 189 connected to the axial feed passage 181 direct oil radially outwardly between the phase gears 46, 71 and 47, 73 and eccentrics 50 and 52, respectively, to lubricate the phase gears and also to pass into the interior of the respective rotors 54 and 56 to effect their cooling. The rotors have an internal web 190 with holes 191 therethrough to provide for circulation therethrough in an axial direction with the oil then exiting axially outward of the rotor and into annular cavities 192, 193 and 194 in the front, intermediate and rear housings 14, 19 and 16 from which it drains as will be described in more detail later.

Oil in the pressurized distribution passage 142 is also delivered by a passage 196 to the oil metering pump 110 which meters oil at a suitable rate to lubricate the rotor's gas seals. The oil metering pump 110 may be of the type disclosed in co-pending U.S. application Ser. No. 357,072, filed May 3, 1973 and assigned to the assignee of this invention and is connected by a line 198 to meter oil to mix with the fuel in the float bowl of the carburetor as shown in FIG. 1 or to ports in the end walls of the housings as disclosed in the aforementioned U.S. Patent application.

Control of the oil pressure in the oil distribution circuit in the engine is by the distribution pressure regulator valve assembly 106 shown in FIG. 1. The valve assembly 106 comprises a valve 200 which is identical to the cooler pressure regulator valve 144 and is received directly in an accommodating stepped diameter blind-end bore 201 in the interface of the front end housing 14. Valve 200 has its unbalanced area 202 acted on by oil received through passage 203 in the front end housing 14 that is connected to passage 168 near where the gallery oil enters the front stationary gear 46. Oil pressure acts on the differential area 202 and against the bias of a coil spring 204 which extends freely through an aperture 205 in the pump cover and is seated at its left-hand end in a recess 206 in the pump body 118 and at its right-hand end on an internal shoulder in the valve. When the valve 200 moves leftward, its radial ports 207 and axial passage 208 vent the excess oil to the pump cover aperture 205 which as best shown in FIG. 6 is open to the suction chamber cavity 130 in the cover plate and thus to the suction chamber 132. Thus, this excess oil is also shunted to the pump's suction chamber 132 rather than back to the oil tank. The distribution pressure regulator valve assembly 106 is set at a lower pressure than the cooler pressure, for example 50 psi, with the difference in the pressure settings of the two regulator valves, 30 psi in this example, being the pressure that is available to push oil through the cooler.

The oil after passing through the main bearings and rotor bearings for their lubrication and the rotor cavities for cooling of the rotors, falls through front, intermediate and rear housing drain cavities 209, 210 and 211 to a horizontal drain passage 214 in the housings as shown in FIGS. 1 and 2. The oil then drains to a drain hole 216 in the rear end housing 16 and into the oil tank 100 through a hole in the top thereof as shown in FIG. 1.

Thus, all the excess or overage from both the cooler pressure regulator valve assembly 104 and distribution pressure regulator valve assembly 106 is delivered directly to the pump's suction chamber 132 and the oil tank receives only the oil that is actually used for lubrication and cooling whereby the power required to drive the oil pump 102 is minimized or conserved while the volumetric efficiency of the pump is increased since this excess oil is pressure fed rather than having to be drawn from a lower level to the suction chamber. For example, in an actual engine there was required ten gallons per minute circulation through the cooler while the engine lubrication system could only handle 5 gallons per minute with the proper pressure settings with the result that the remaining 5 gallons per minute is overage. With the present invention this five gallons per minute of excess oil that is unable to flow for lubrication is shunted directly to the suction of the pump. Thus, only 5 gallons per minute is required to be drawn up the suction passage of the pump and this together with the 5 gallon pressure feed directly to pump suction produces a very substantial advantage in terms of minimum power requirement and maximum efficiency over systems dumping all the excess oil to the sump.

The above described embodiment is illustrative of the invention which may be modified within the scope of the appended claims.

We claim:

1. A rotary engine comprising a multipart housing including a rotor housing, an end housing having one side closing one side of said rotor housing and having an oppositely facing external side, another housing part closing the other side of said rotor housing, a crankshaft rotatably supported in bearings in said multipart housing, said crankshaft having an eccentric located in said rotor housing, a hollow rotor rotatably supported by a bearing on said eccentric, an internal tooth phase gear fixed to one side of and concentric with said rotor, an annular external tooth phase gear freely received about and concentric with said crankshaft and fixed to said end housing and meshing with said internal tooth gear, and a lubrication system comprising an oil tank secured to said multipart housing in an underneath location, an internal-external gear oil pump mounted about said crankshaft and secured to said external side of said end housing and having the external gear thereof driven by said crankshaft, said pump having a suction chamber and a pressure chamber, suction passage means in said multipart housing connecting said oil tank to said suction chamber, passage means in said crankshaft for distributing oil to said bearings and said phase gears for lubrication and also to the interior of said rotor for cooling, pressure passage means connecting said pressure chamber to said crankshaft passage means, drain passage means in said multipart housing for draining oil from said bearings and phase gears and the interior of said rotor to said oil tank, cooler means in said pressure passage means external of said multipart housing for cooling the oil prior to delivery to said bearings, said phase gears and the interior of said rotor, distribution pressure regulator valve means for regulating the oil pressure in said pressure passage means downstream of said cooler means at a predetermined value sufficient to provide adequate distribution to said bearings, said phase gears and the interior of said rotor over the engine's normal speed range, cooler pressure regulator valve means for regulating the oil pressure in said pressure passage means upstream of said cooler means at a predetermined value substantially higher than said regulated distribution pressure but lower than the pressure limit of said cooler means, and both said pressure regulator valve means having an exhaust passage directly open to said suction chamber of said pump for delivering oil overage from their regulating operations directly to said suction chamber of said pump in shunt relation to said oil tank.

2. A rotary engine comprising a multipart housing including a rotor housing, an end housing having one side closing one side of said rotor housing and having an oppositely facing external side, another housing part closing the other side of said rotor housing, a crankshaft rotatably supported in bearings in said multipart housing, said crankshaft having an eccentric located in said rotor housing, a hollow rotor rotatably supported by a bearing on said eccentric, an internal tooth phase gear fixed to one side of and concentric with said rotor, an annular external tooth phase gear freely received about and concentric with said crankshaft and fixed to said end housing and meshing with said internal tooth gear, and a lubrication system comprising an oil tank secured to said multipart housing in an underneath location, an internal-external gear oil pump mounted about said crankshaft and secured to said external side of said end housing and having the external gear thereof driven by said crankshaft, said pump having a suction chamber and a pressure chamber, suction passage means in said multipart housing connecting said oil tank to said suction chamber, passage means in said crankshaft for distributing oil to said bearings and said phase gears for lubrication and also to the interior of said rotor for cooling, pressure passage means connecting said pressure chamber to said crankshaft passage means, drain passage means in said multipart housing for draining oil from said bearings and phase gears and the interior of said rotor to said oil tank, cooler means in said pressure passage means external of said multipart housing for cooling the oil prior to delivery to said bearings, said phase gears and the interior of said rotor, distribution pressure regulator valve means for regulating the oil pressure in said pressure passage means downstream of said cooler means at a predetermined value sufficient to provide adequate distribution to said bearings, said phase gears and the interior of said rotor over the engine's normal speed range, cooler pressure regulator valve means for regulating the oil pressure in said pressure passage means upstream of said cooler means at a predetermined value substantially higher than said regulated distribution pressure but lower than the pressure limit of said cooler means, and both said pressure regulator valve means having an exhaust passage directly open to and elevated above said suction chamber of said pump for delivering oil overage under gravity from their regulating operations directly to said suction chamber of said pump in shunt relation to said oil tank.

3. A rotary engine comprising a multipart housing including a rotor housing, an end housing having one side closing one side of said rotor housing and having an oppositely facing external side, another housing part closing the other side of said rotor housing, a crankshaft rotatably supported in bearings in said multipart housing, said crankshaft having an eccentric located in said rotor housing, a hollow rotor rotatably supported by a bearing on said eccentric, an internal tooth phase gear fixed to one side of and concentric with said rotor, an annular external tooth phase gear freely received about and concentric with said crankshaft and fixed to said end housing and meshing with said internal tooth gear, and a lubrication system comprising an oil tank secured to said multipart housing in an underneath location, an internal-external gear oil pump mounted about said crankshaft and secured to said external side of said end housing and having the external gear thereof driven by said crankshaft, said pump having s suction chamber and a pressure chamber, suction passage means in said multipart housing connecting said oil tank to said suction chamber, passage means in said crankshaft for distributing oil to said bearings and said phase gears for lubrication and also to the interior of said rotor for cooling, pressure passage means connecting said pressure chamber to said crankshaft passage means, drain passage means in said multipart housing for draining oil from said bearings and phase gears and the interior of said rotor to said oil tank, cooler means in said pressure passage means external of said multipart housing for cooling the oil prior to delivery to said bearings, said phase gears and the interior of said rotor, distribution pressure regulator valve means mounted in said external side of said end housing for regulating the oil pressure in said pressure passage means downstream of said cooler means at a predetermined value sufficient to provide adequate distribution to said bearings, said phase gears and the interior of said rotor over the engine's normal speed range, cooler pressure regulator valve means also mounted in said external side of said end housing adjacent said distribution pressure regulator valve means for regulating the oil pressure in said pressure passage means upstream of said cooler means at a predetermined value substantially higher than said regulated distribution pressure but lower than the pressure limit of said cooler means, and both said pressure regulator valve means having an exhaust passage directly open to said suction chamber of said pump for delivering oil overage from their regulating operations directly to said suction chamber of said pump in shunt relation to said oil tank.

4. A rotary engine comprising a multipart housing including a rotor housing, an end housing having one side closing one side of said rotor housing and having an oppositely facing external side, another housing part closing the other side of said rotor housing, a crankshaft rotatably supported in bearings in said multipart housing, said crankshaft having an eccentric located in said rotor housing, a hollow rotor rotatably supported by a bearing on said eccentric, an internal tooth phase gear fixed to one side of and concentric with said rotor, an annular external tooth phase gear freely received about and concentric with said crankshaft and fixed to said end housing and meshing with said internal tooth gear, and a lubrication system comprising an oil tank secured to said multipart housing in an underneath location, an internal-external gear oil pump mounted about said crankshaft and secured to said external side of said end housing and having the external gear thereof driven by said crankshaft, said pump having a suction chamber and a pressure chamber, suction passage means in said multipart housing connecting said oil tank to said suction chamber, passage means in said crankshaft for distributing oil to said bearings and said phase gears for lubrication and also to the interior of said rotor for cooling, pressure passage means connecting said pressure chamber to said crankshaft passage means, drain passage means in said multipart housing for draining oil from said bearings and phase gears and the interior of said rotor to said oil tank, cooler means in said pressure passage means external of said multipart housing for cooling the oil prior to delivery to said bearings, said phase gears and the interior of said rotor, a filter in said pressure passage means downstream of said cooler, a bypass valve for bypassing said filter when the pressure differential thereacross exceeds a predetrmined value, distribution pressure regulator valve means mounted in said external side of said end housing for regulating the oil pressure in said pressure passage means downstream of said cooler means at a predetermined value sufficient to provide adequate distribution to said bearings, said phase gears and the interior of said rotor over the engine's normal speed range, cooler pressure regulator valve means also mounted in said external side of said housing adjacent said distribution pressure regulator valve means for regulating the oil pressure in said pressure passage means upstream of said cooler means at a predetermined value substantially higher than said regulated distribution pressure but lower than the pressure limit of said cooler means, and both said pressure regulator valve means having an exhaust passage directly open to and elevated above said suction chamber of said pump for delivering oil overage under pressure from their regulating operations directly to said suction chamber of said pump in shunt relation to said oil tank.

5. A rotary engine comprising a multipart housing including a rotor housing, an end housing having one side closing one side of said rotor housing and having an oppositely facing external side, another housing part closing the other side of said rotor housing, a crankshaft rotatably supported in bearings in said multipart housing, said crankshaft having an eccentric located in said rotor housing, a hollow rotor rotatably supported by a bearing on said eccentric, an internal tooth phase gear fixed to one side of and concentric with said rotor, an annular external tooth phase gear freely received about and concentric with said crankshaft and fixed to said end housing and meshing with said terminal tooth gear, and a lubrication system comprising an oil tank secured to said multipart housing in an underneath location, an internal-external gear oil pump mounted about said crankshaft and secured to said external side of said end housing and having the external gear thereof driven by said crankshaft, said pump having a suction chamber and a pressure chamber, suction passage means in said multipart housing connecting said oil tank to said suction chamber, passage means in said crankshaft for distributing oil to said bearings and said phase gears for lubrication and also to the interior of said rotor for cooling, pressure passage means connecting said pressure chamber to said crankshaft passage means, drain passage means in said multipart housing for draining oil from said bearings and phase gears and the interior of said rotor to said oil tank, cooler means in said pressure means external of said multipart housing for cooling the oil prior to delivery to said bearings, said phase gears and the interior of said rotor, distribution pressure regulator valve means including a spring biased valve member mounted for reciprocal movement in said external side of said end housing for regulating the oil pressure in said pressure passage means downstream of said cooler means at a predetrmined value sufficient to provide adequate distribution to said bearings, said phase gears and the interior of said rotor over the engine's normal speed range, cooler pressure regulator valve means including a spring biased valve member also mounted for reciprocal movement in said external side of said end housing adjacent said distribution pressure regulator valve means for regulating the oil pressure in said pressure passage means upstream of said cooler means at a predetermined value substantially higher than said regulated distribution pressure but lower than the pressure limit of said cooler means, and both said valve members having an exhaust passage therein directly open to and elevated above said suction chamber of said pump for delivering oil overage under pressure from their regulating operations directly to said suction chamber of said pump in shunt relation to said oil tank.

* * * * *

UNITED STATES PATENT OFFICE
CERTIFICATE OF CORRECTION

PATENT NO. : 3,855,987
DATED : December 24, 1974
INVENTOR(S) : Raymond J. Green, Erkki A. Koivunen It is certified that error appears in the above-identified patent and that said Letters Patent are hereby corrected as shown below:

Column 3, line 7, "continously" should read -- continuously --; line 29, "now" should read -- not --.
Column 9, line 45, "predetrmined" should read -- predetermined --; line 53, after "said" (second occurrence) insert -- end --.
Column 10, line 18, "terminal" should read -- internal --; line 34, after "pressure" insert -- passage --; line 42, "predetrmined" should read -- predetermined --.

Signed and sealed this 17th day of June 1975.

(SEAL)
Attest:

RUTH C. MASON
Attesting Officer

C. MARSHALL DANN
Commissioner of Patents
and Trademarks